United States Patent
Navarra Pruna

(12) United States Patent (10) Patent No.: US 6,749,420 B2
Navarra Pruna (45) Date of Patent: Jun. 15, 2004

(54) FLEXIBLE EJECTOR FOR INJECTION MOLDS

(76) Inventor: Alberto Navarra Pruna, Juan Ramón Jiménez 8, E-08960, Sant Just Desvern (ES)

( * ) Notice: Subject to any disclaimer, the term of this patent is extended or adjusted under 35 U.S.C. 154(b) by 220 days.

(21) Appl. No.: 09/924,774

(22) Filed: Aug. 8, 2001

(65) Prior Publication Data

US 2002/0048618 A1 Apr. 25, 2002

(30) Foreign Application Priority Data

Oct. 25, 2000 (ES) .......................................... 200002560

(51) Int. Cl.⁷ .............................................. B29C 45/44
(52) U.S. Cl. ................. 425/556; 425/577; 425/DIG. 58
(58) Field of Search ............................ 425/556, 577, 425/DIG. 58

(56) References Cited

U.S. PATENT DOCUMENTS

| | | | | |
|---|---|---|---|---|
| 3,593,366 A | * | 7/1971 | Smith ........................... | 425/78 |
| 3,642,417 A | * | 2/1972 | Von Holdt .................. | 425/443 |
| 5,540,582 A | * | 7/1996 | Catalonotti et al. ......... | 425/577 |
| 6,345,974 B1 | * | 2/2002 | Kawasaki et al. .......... | 425/149 |
| 2002/0094356 A1 | * | 7/2002 | Navarra Pruna ............ | 425/556 |

* cited by examiner

Primary Examiner—W. L. Walker
Assistant Examiner—Emmanuel Luk
(74) Attorney, Agent, or Firm—Ostrolenik, Faber, Gerb & Soffen, LLP

(57) ABSTRACT

Provided with a rod (1) meant to be attached to the ejector plate (9) which extends in a flat and elastically deformable neck (2) which ends in a small header (3) provided with a material recess (4) which is adapted in shape and size to the negative (5) to be obtained, said header (3) having a basically rectangular prismatic shape, that is with faces which are parallel by pairs, in order to simplify its machining, while the diagonal length of its section is equal to or smaller than the diameter of the rod (1), allowing its assembly from the outside of the body (7) of the mold. In order to attach the rod (1) to the ejector plate (9) said rod is provided with an externally threaded segment (10) on which moves a screw (11) which allows a precision adjustment of the axial position of said rod (1), which rod in turn is immobilized in an angular sense as it has a flat facet in correspondence with one of its generator lines, on which acts a key (14). A bushing (15) mounted on the body (7) of the mold provides the guide (8) for header (3), which can slide smoothly and with a perfect adjustment.

16 Claims, 3 Drawing Sheets

FLEXIBLE EJECTOR FOR INJECTION MOLDS

OBJECT OF THE INVENTION

The present invention relates to an ejector for use in injection molds for plastic, aluminum, bakelite or any other material, which is installed in the mold as such ejector and is meant to be a complementary molder for small negatives allowing a simple removal form the mold of said negative areas.

The object of the invention is to provide a ejector of simple manufacture, with the resulting repercussions on costs, with a simple installation on the mold in which all bores required are perpendicular to the plate and cylindrical, with substantial savings of space in the mold ejector plates and a greater structural rigidity.

BACKGROUND OF THE INVENTION

In a conventional molding process there are often recesses or orifices in the parts to be obtained in a direction which is perpendicular to the ejection of said part, that is, "negatives" which would preclude mold removal without the use of elements which may move in several directions, before or simultaneously to ejection of the part, which free the negatives to be obtained.

The applicant holds Spanish Utility Model with application number U 9502186, relating to a molding-ejection accessory for injection molds, particularly designed to form and release small negatives of the injected part to be obtained, and which consists of a single part body preferably made from tempered steel on which an end segment is defined in the form of a rod meant to be connected to the ejector plate parallel to the conventional ejectors which are attached to said plate, and which acts simultaneously to these, which rod on its opposite through a flat, elastically deformable neck ends in a small header which due to the elasticity of the aforementioned neck tends to adopt an angled position with respect to the rod, which header moves inside a housing which is formally and dimensionally adapted to said head, operationally provided on the mold, with the header also provided with a recess which is formally and dimensionally adapted to the corresponding negative part or area of the part to be obtained.

In accordance with this structure, during the molding stage the header takes part in the molding chamber, specifically through the aforementioned recess, and after the part is injected and in the ejection operation this ejector, by means of the elastic recovery of its neck will move laterally with respect to the negative area of said part, becoming physically independent of it and allowing its final release.

This solution has a drawback which is mainly related to the following aspects:

The trunco-conical configuration of the header makes its machining complex and therefore expensive, as well as that of the housing to be provided in the mold plate in each case.

The adjustment of these parts, the header and the housing, is difficult and costly as the only way to achieve this is to increase the depth of the housing, which because of its trunco-conical shape is a slow and expensive process and can only be performed with specialized electro-erosion machinery, whether by penetration or by filament, further requiring a manual adjustment process to attain a smooth sliding.

The blind and threaded axial orifice of the free end of the rod, as well as being difficult to obtain, results in a weakening of said rod and thereby for the ejector as a whole. In addition, it must be perfectly leveled with the ejector plate as if the ejector is cut too much the screw may stretch its neck and quicken the material fatigue, reducing elasticity and therefore functionality.

There is a considerable risk that the ejector rod will rotate in its housing as the screw is tightened, and as the header is immobilized in its housing the neck will suffer a torsion which also accelerates material fatigue.

The total length of the ejector is a critical factor for the process of installation and adjustment in the mold, as a small difference in the length of the ejector and its housing may give rise to a forced operation or premature fatigue, so that its functionality is always dependent on the final user, which is a crucial factor.

Given the trunco-conical configuration of the header there is no possibility for correction once the negative has been machined in it, whether axially or longitudinally.

During the injection process the temperature will increase, causing dilation of the mold as a whole and therefore affecting to a certain extent the length of the housing, so that a perfectly installed ejector may also suffer from premature fatigue without an obvious reason.

All of the above results in a considerable difficulty for providing an effective solution for the mold removal of small negatives simultaneously to ejection of the part, and it is with the purpose of simplifying this task that this new invention is disclosed.

DESCRIPTION OF THE INVENTION

The ejector for injection molds disclosed, in accordance with the basic structural lines of the aforementioned Utility Model U 9502186, includes a number of improvements on said model which solve all of the above described drawbacks in a fully satisfactory manner.

For this purpose and more specifically, in accordance with one of the characteristics of the invention, the ejector header has a rectangular section with faces which are parallel by pairs, which makes the machining and later rectification of all faces much less costly and possible with conventional machinery.

In accordance with another characteristic of the invention, the ejector rod, basically cylindrical, is externally threaded so that on it may be mounted a screw which after regulation is attached in the ejector plate, which allows a positional regulation in the axial sense of the ejector. This rod presents a flat facet in correspondence with one of its generating lines (i.e., the line of the border of a cylinder which with the aid of a key operationally provided on the ejector plate, immobilizes the ejector in an angular sense while allowing its axial motion with respect to said ejector plate, for a correct and final positioning of the ejector inside the mold without requiring a critical length of the rod.

In addition, the diameter of said rod is made equal to or greater than the diagonal length of the header section, so that on one side the ejector can be machined from a market available rod and on the other allows to introduce said ejector in the mold from the outside, that is, from the ejector plates.

Finally, and in accordance with another characteristics of the invention, a bushing is provided which is cylindrical on the outside for a simple installation on the mold plate, having a rectangular inner orifice which matches the size of the ejector header to provide the user with an already adapted housing for the header, simplifying the task and the requirements of sophisticated machinery to a minimum.

In this manner a smooth sliding between the bushing and the ejector is obtained in any working conditions, without being affected by the temperature of the mold nor by undesired dilations or displacements between moving parts, further allowing, as an advantage with respect to any known mold removal mechanism, a dimensional regulation or adjustment in an axial sense of the position of the negative to be removed form the mold, by simply turning the securing screw clockwise to increase its distance from the mold partition line and in the opposite sense to reduce said distance.

DESCRIPTION OF THE DRAWINGS

The characteristics of the present invention will be better understood in view of the accompanying drawings of a preferred embodiment of the invention, where in a non-limiting manner and for purposes of illustration only the following is shown.

PREFERRED EMBODIMENT OF THE INVENTION

Figure 1:
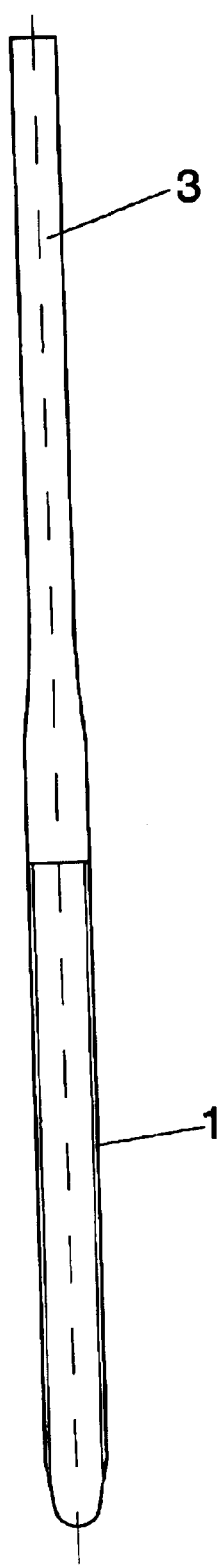
FIG. 1 shows a front elevation view of a flexible ejector for injection molds in accordance with the object of the present invention.
Figure 2:
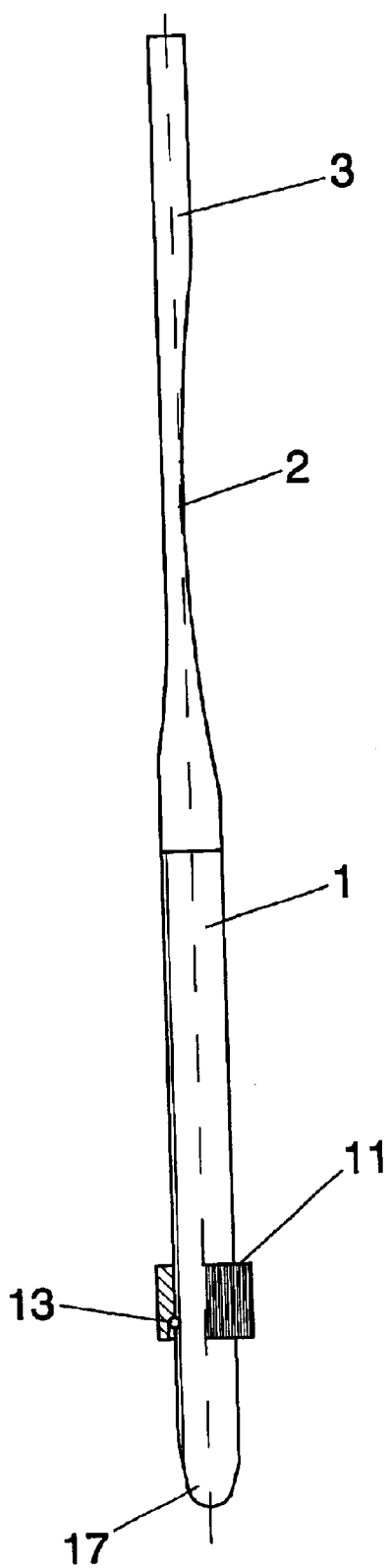
FIG. 2 shows a profile of said ejector, elastically deformed, that is in the coaxial position of its header with respect to the rod when it is fully retracted and housed within the mold body.
Figure 3:
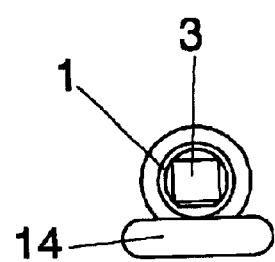
FIG. 3 shows an axial view of the assembly of the previous figures.

In view of the related figures, the flexible ejector for injection molds taught can be seen to consist of a single body preferably made of tempered steel, in which is defined a rod (1) which, through flat and elastically deformable neck (2) ends in a small header (3) provided on its free end with a material recess (4) meant to provide a negative (5) in the injected part (6), which recess can adopt any shape depending on the negative to be obtained in each case, for which purpose the recess (4) is aided by the body (7) of the mold by orifice (8) in which said header (3) is coupled and within which it may move.

In accordance now with the characteristics of the invention, said header (3), regardless of the material recess (4) specific for each case, has a rectangular prism shape, so that its lateral faces are parallel by pairs, allowing a simple machining.

Along the same lines, the diagonal length of the section of the header (3) is made smaller than the diameter of the rod (1), so that a market-available rod may be used to obtain the ejector by machining it to obtain correctly the header (3) and the elastically deformable neck (2).

Attachment of the rod (1) and thereby of the ejector as a whole to the ejector plate (9) is achieved by providing the rod (1) with a large segment (10) which is externally threaded, in order to receive a screw (11) which is finally set in a housing (12) of the bottom ejector plate (9') and which is immobilized in its final working position by for example a silicone gasket (13).

To fight the tendency of the rod (1) to rotate during its assembly operation and due to the rotation of screw (11), the top ejector plate (9) is provided in the area in which it meets the housing (12) of the bottom ejector plate (9') with a key (14), while the rod (1) incorporates on its threaded segment (10) a small flat facet on which the key acts so that the rod (1) is immobilized in an angular sense but is free to move in an axial sense, as it is carried by the screw (11).

Figure 4:
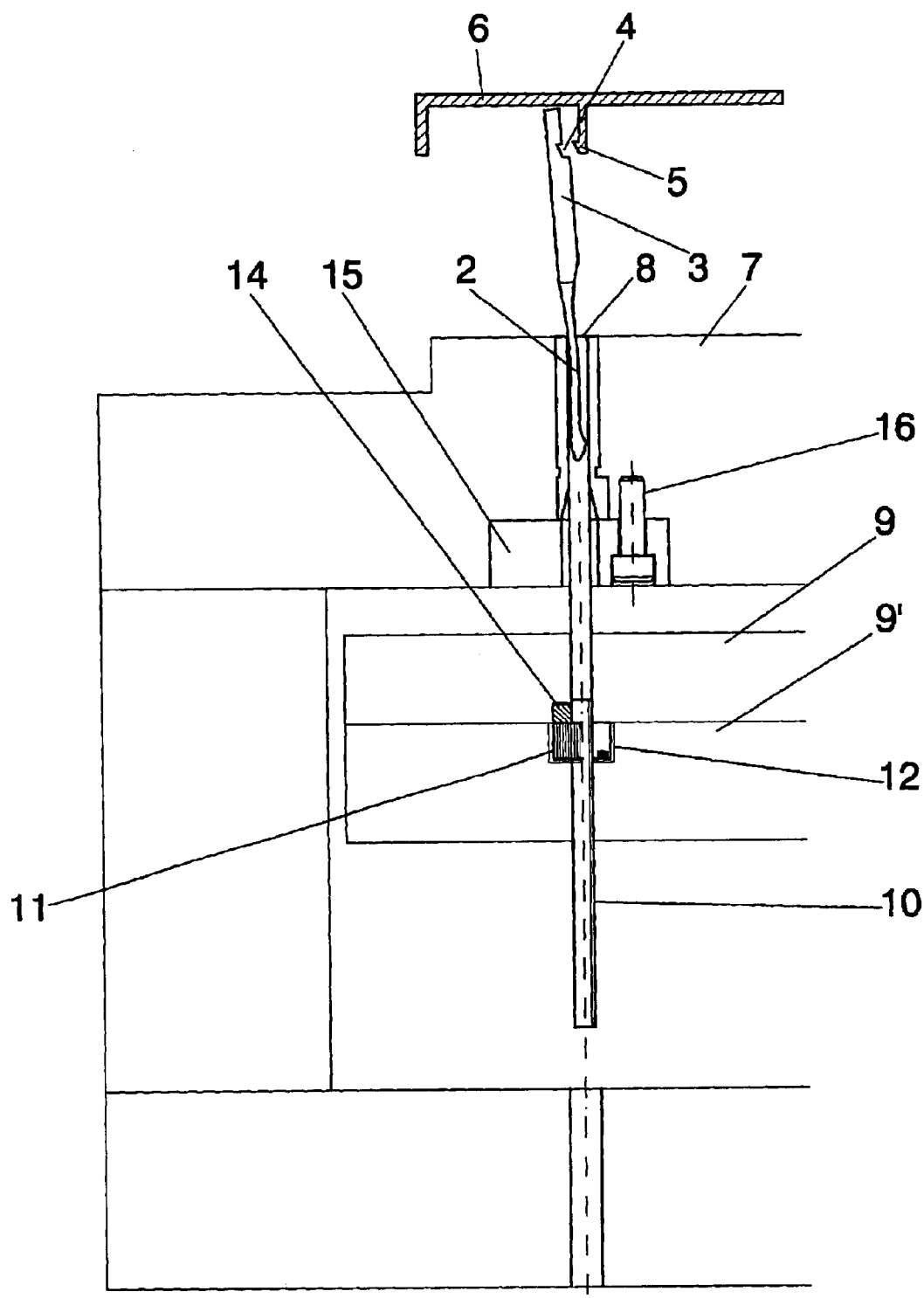
FIG. 4 shows the same ejector of the previous figures, here mounted in an injection mold in the position corresponding to the molding stage.
Figure 5:
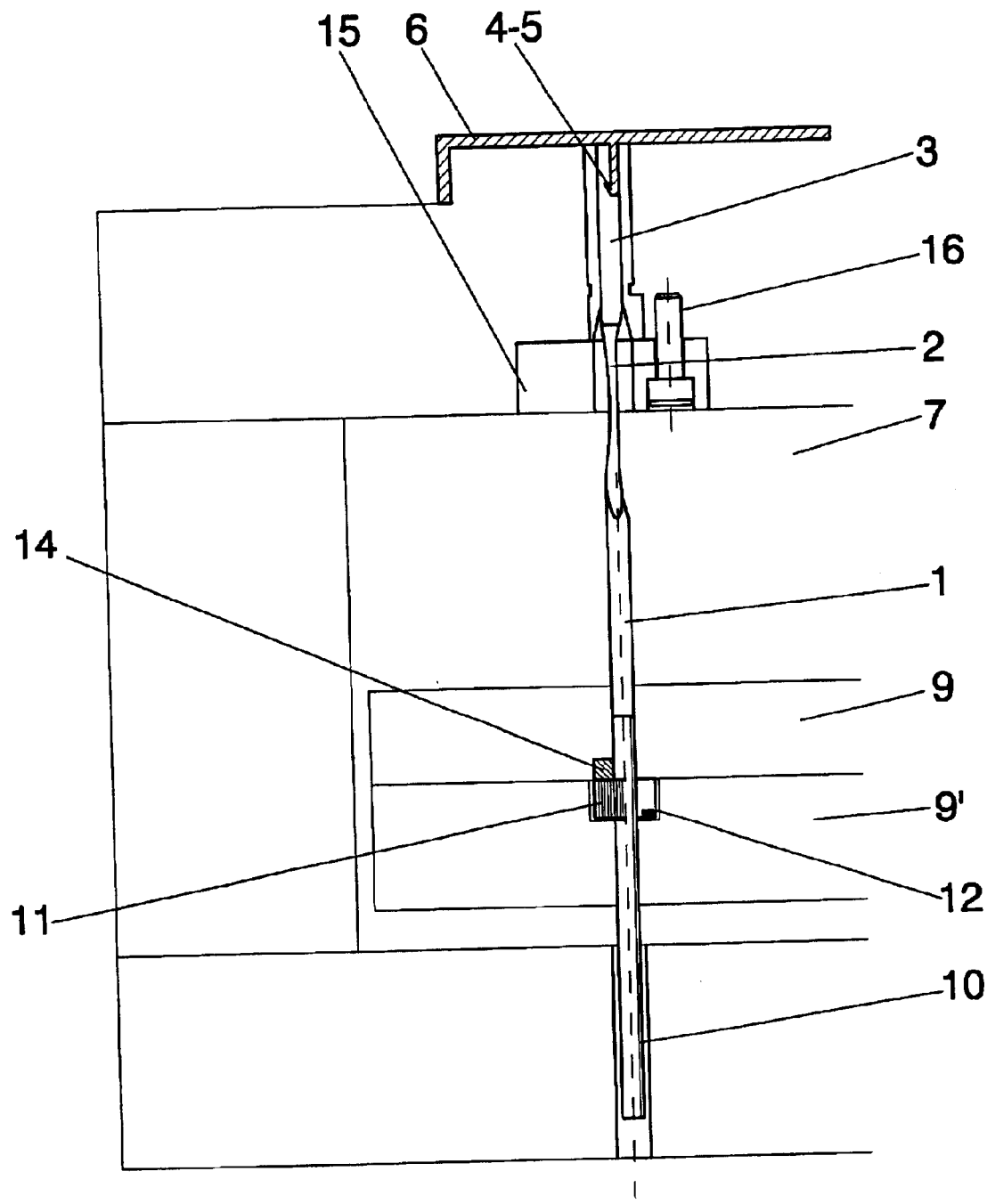
FIG. 5 shows, finally, a similar view to the previous figure in which the assembly is in the mold removal stage.

This particular assembly and regulation system for the rod eliminates the need of a critical length for it, as well as eliminating the need to cut the excess length of the rod which is beyond the screw (11) after assembly, as can be seen in FIGS. 4 and 5.

Finally, and in order to "standardize" the assembly of the ejector on the injection mold so that said mold is not affected by the assembly on it of several types of ejectors, the orifice or housing (8) for the header (3) is not made directly on the body of the mold (7), but instead the ejector is provided with a bushing (15) in which said housing (8) is provided, which is attached to the mold, for example, with the aid of a screw (16) in a rear and widened area of said bushing (15). In this way different bushings (15) corresponding to different ejectors will have identical external dimensions, so that in the mold (7) the corresponding housing also has constant dimensions, so that a bushing (15) is used which is adapted to the type of ejector required for the injection mold.

Lastly, it should be mentioned that in order to simplify the coupling of screw (11) to the rod (1) the free end (17) of the latter is made clearly convergent, acting as a centering part for the screw.

What is claimed is:

1. Flexible ejector for injection molds, of the type meant to make small negatives of the injected part to be obtained, and of those having a rod provided with means of attachment to the ejector plate, which through a flat and elastically deformable neck ends in a small header which incorporates a material recess, of a shape and size matching that of the negative area of the part to be obtained characterized in that said header (3), with the exception of the material recess (4) which corresponds to the negative to be obtained and which is variable depending on the configuration of said negative, adopts a rectangular prismatic shape, that is, with faces which are parallel by pairs in order to simplify its matching, wherein the rod (1) presents in its externally threaded segment (10) a small flat facet in correspondence with one of its generating lines, in order to immobilize the ejector in an angular sense, while allowing it to move freely in an axial sense, with the aid of key (14) also provided between the ejector plates (9–9'), preferably on the ejector plate (9) which does not receive the screw (11).

2. Flexible ejector for injection molds, according to claim 1, characterized in that the diagonal length of the section of the header (3) is equal to or smaller than the diameter of the rod (1), so that it allows to both introduce the ejector in its housing from the ejector plates (9–9') towards the inside of the mold, and to obtain the machining of the ejector from a market-available rod.

3. Flexible ejector for injection molds according to claim 1, characterized in that the rod (1) presents an end segment (10) which is externally threaded in order to attach the ejector with the aid of a screw (11) which allows a precision adjustment of the axial position of its header (3) with respect to a body (7) of the mold during the molding stage.

4. Flexible ejector for injection molds according to claim 2, characterized in that the rod (1) presents an end segment

(10) which is externally threaded in order to attach the ejector with the aid of a screw (11) which allows a precision adjustment of the axial position of its header (3) with respect to a body (7) of the mold during the molding stage.

5. Flexible ejector for injection molds according to claim 3, characterized in that said screw (11) is housed between two ejector plates (9–9'), specifically in a housing (12) of the latter one, and is immobilized after it is regulated with the aid of a silicone gasket (13) or any other suitable means.

6. Flexible ejector for injection molds according to claim 4, characterized in that said screw (11) is housed between two ejector plates (9–9'), specifically in a housing (12) of the latter one, and is immobilized after it is regulated with the aid of a silicone gasket (13) or any other suitable means.

7. Flexible ejector for injection molds according to claim 1, characterized in that between the header (3) and a body (7) of the injection mold is provided a housing for a bushing (15), suitably attached to the body (7) of the mold such as with a screw (16), so that it is in this bushing (15) where the housing and passage (8) is provided for the header (3) of the ejector, with a perfect adjustment to the latter and with a smooth sliding of the same.

8. Flexible ejector for injection molds according to claim 2, characterized in that between the header (3) and a body (7) of the injection mold is provided a housing for a bushing (15), suitably attached to the body (7) of the mold such as with a screw (16), so that it is in this bushing (15) where the housing and passage (8) is provided for the header (3) of the ejector, with a perfect adjustment to the latter and with a smooth sliding of the same.

9. Flexible ejector for injection molds according to claim 3, characterized in that between the header (3) and the body (7) of the injection mold is provided a housing for a bushing (15), suitably attached to the body (7) of the mold such as with a screw (16), so that it is in this bushing (15) where the housing and passage (8) is provided for the header (3) of the ejector, with a perfect adjustment to the latter and with a smooth sliding of the same.

10. Flexible ejector for injection molds according to claim 5, characterized in that between the header (3) and the body (7) of the injection mold is provided a housing for a bushing (15), suitably attached to the body (7) of the mold such as with a screw (16), so that it is in this bushing (15) wherein the housing and passage (8) is provided for the header (3) of the ejector, with a perfect adjustment to the latter and with a smooth sliding of the same.

11. Flexible ejector for injection molds according to claim 1, characterized in that between the header (3) and a body (7) of the injection mold is provided a housing for a bushing (15), suitably attached to the body (7) of the mold such as with a screw (16), so that it is in this bushing (15) where the housing and passage (8) is provided for the header (3) of the ejector, with a perfect adjustment to the latter and with a smooth sliding of the same.

12. Flexible ejector for injection molds according to claim 7, characterized in that both the housing for the bushing (15) of the body (7) of the mold and the orifices for passage of the rod (1) in ejector plates (9–9') are cylindrical and perpendicular to the body of the mold and the ejector plates, which simplifies both their machining and the installation of the ejector in the corresponding mold.

13. Flexible ejector for injection molds according to claim 8, characterized in that both the housing for the bushing (15) of the body (7) of the mold and the orifices for passage of the rod (1) in ejector plates (9–9') are cylindrical and perpendicular to the body of the mold and the ejector plates, which simplifies both their machining and the installation of the ejector in the corresponding mold.

14. Flexible ejector for injection molds according to claim 9, characterized in that both the housing for the bushing (15) of the body (7) of the mold and the orifices for passage of the rod (1) in ejector plates (9–9') are cylindrical and perpendicular to the body of the mold and the ejector plates, which simplifies both their machining and the installation of the ejector in the corresponding mold.

15. Flexible ejector for injection molds according to claim 10, characterized in that both the housing for the bushing (15) of the body (7) of the mold and the orifices for passage of the rod (1) in ejector plates (9–9') are cylindrical and perpendicular to the body of the mold and the ejector plates, which simplifies both their machining and the installation of the ejector in the corresponding mold.

16. Flexible ejector for injection molds according to claim 11, characterized in that both the housing far the bushing (15) of the body (7) of the mold and the orifices far passage of the rod 91) in ejector plates (9–9') are cylindrical and perpendicular to the body of the mold and the ejector plates, which simplifies both their machining and the installation of the ejector in the corresponding mold.

\* \* \* \* \*